(12) United States Patent
Momot

(10) Patent No.: US 9,881,153 B2
(45) Date of Patent: Jan. 30, 2018

(54) SYSTEM AND METHOD FOR DETECTION OF HEAP SPRAY ATTACK

(71) Applicant: Leviathan, Inc., Seattle, WA (US)

(72) Inventor: Falcon Momot, Seattle, WA (US)

(73) Assignee: Leviathan, Inc., Seattle, WA (US)

( * ) Notice: Subject to any disclaimer, the term of this patent is extended or adjusted under 35 U.S.C. 154(b) by 0 days.

(21) Appl. No.: 14/745,300

(22) Filed: Jun. 19, 2015

(65) Prior Publication Data

US 2016/0004861 A1 Jan. 7, 2016

Related U.S. Application Data

(60) Provisional application No. 62/014,954, filed on Jun. 20, 2014.

(51) Int. Cl.
*G06F 21/00* (2013.01)
*G06F 21/55* (2013.01)

(52) U.S. Cl.
CPC ...... *G06F 21/552* (2013.01); *G06F 2221/034* (2013.01)

(58) Field of Classification Search
CPC ...... G06F 21/552; G06F 21/554; G06F 21/50; G06F 21/52; G06F 21/53; G06F 21/55; G06F 21/56; G06F 21/566; G06F 2221/034

USPC .......................................................... 726/23
See application file for complete search history.

(56) References Cited

U.S. PATENT DOCUMENTS

2007/0143850 A1* 6/2007 Kraemer ............... G06F 21/55
726/25
2013/0152200 A1* 6/2013 Alme .................... H04L 63/145
726/24

\* cited by examiner

*Primary Examiner* — Yogesh Paliwal
(74) *Attorney, Agent, or Firm* — Vernon Francissen

(57) ABSTRACT

Methods, systems and media are shown for detecting a heap spray event involving examining user allocated portions of heap memory for a process image, determining a level of entropy for the user allocated portions, and, if the level of entropy is below a threshold, performing secondary heuristics, and detecting a heap spray event based on results of the secondary heuristics. In some examples, performing the secondary heuristics may include analyzing a pattern of memory allocation for the user allocated portions, analyzing data content of the user allocated portions of heap memory, or analyzing a heap allocation size for the user allocated portions of heap memory.

7 Claims, 6 Drawing Sheets

SYSTEM AND METHOD FOR DETECTION OF HEAP SPRAY ATTACK

CROSS REFERENCE TO RELATED APPLICATIONS

This application claims the benefit of U.S. Provisional Patent Appl. No. 62/014,954 for "System and Method for Detection of Heap Spray Attack" filed Jun. 20, 2014, herein incorporated by reference in its entirety for all purposes.

GOVERNMENT LICENSE RIGHTS

This invention was made with government support under FA8750-12-C-0161 awarded by the Air Force Research Laboratory. The government has certain rights in the invention.

BACKGROUND

Computer networks and the devices and services that reside on them are often the subject of attacks by parties that are attempting to improperly access information and resources or to introduce malicious code to the networks. One form of attack is a heap spray attack that involves the introduction of large amounts of data into process memory in order to cause the allocation of certain regions and to provide a large pool of addresses to which execution can be branched that will result in attack payload execution.

SUMMARY

According to one aspect of the present invention, a method for detecting a heap spray event is shown involving examining one or more user allocated portions of heap memory for a process image, determining a level of entropy for the one or more user allocated portions, if the level of entropy is below a predetermined threshold, then performing one or more secondary heuristics, and detecting a heap spray event based on results of the one or more secondary heuristics.

In a refinement of the method, the function of performing one or more secondary heuristics includes one or more of analyzing a pattern of memory allocation for the one or more user allocated portions of heap memory, analyzing data content of the one or more user allocated portions of heap memory, and analyzing a heap allocation size for the one or more user allocated portions of heap memory. In a further refinement, the function of detecting a heap spray event based on results of the one or more secondary heuristics involves collecting scores from one or more secondary heuristics performed for the one or more user allocated portions of heap memory for the process image, applying a Bayesian probability to the collected scores, and determining whether the Bayesian probability is greater than a threshold. In another further refinement, the function of detecting a heap spray event based on results of the one or more secondary heuristics involves detecting a heap spray event if the result of each of the one or more secondary heuristics is consistent with a heap spray event.

Another embodiment of a method for detecting a heap spray event in accordance with certain aspects of the present invention involves examining multiple user allocated portions of heap memory for a process image and, for each user allocated portion, determining a level of entropy for the user allocated portion, performing a plurality of secondary heuristics, and producing a weighted value based on the entropy level and secondary heuristics results. The method further involves detecting a heap spray event based on the combined weighted values for the multiple user allocated portions of heap memory.

BRIEF DESCRIPTION OF THE DRAWINGS

Various embodiments in accordance with the present disclosure will be described with reference to the drawings, in which:

FIG. 4 shows the memory layout before the heap spray and illustrates legitimately allocated data at positions 302 and 304 and FIG. 5 shows;

FIG. 4 is a schematic diagram illustrating the memory layout corresponding to the example of FIG. 2 and shows the memory layout before the heap spray and illustrates legitimately allocated data at positions 302 and 304;

FIG. 5 is a schematic diagram illustrating the memory layout corresponding to the example of FIG. 3 and shows the memory layout after the heap spray has occurred and illustrates a large block of memory 330 allocated to the heap starting at address 0x0c0c0c0c;

Note that the same numbers are used throughout the disclosure and figures to reference like components and features.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Examples of methods and systems are shown for developing a profile for an attacking entity in order to predict future behaviour and assess the type and level of response required. The method involves discerning, for example, a level of expertise and sophistication, and to a certain extent the available resources, of an attacker from available information (e.g. forensic logs). Expertise, sophistication, and resources may be inferred from data regarding the techniques used by a particular threat, such as the difficulty of use of the attack techniques as well as whether or not they are publicly known or made simpler by the manner in which they are distributed to the public. In a sense, the heap spray is fingerprinted. For example, if a hidden Markov model of the heap spray looks similar to another hidden Markov model of heap spray, then it is inferred that the attackers are using related tools and techniques and may be the same or a similar attacker.

Figure 1:
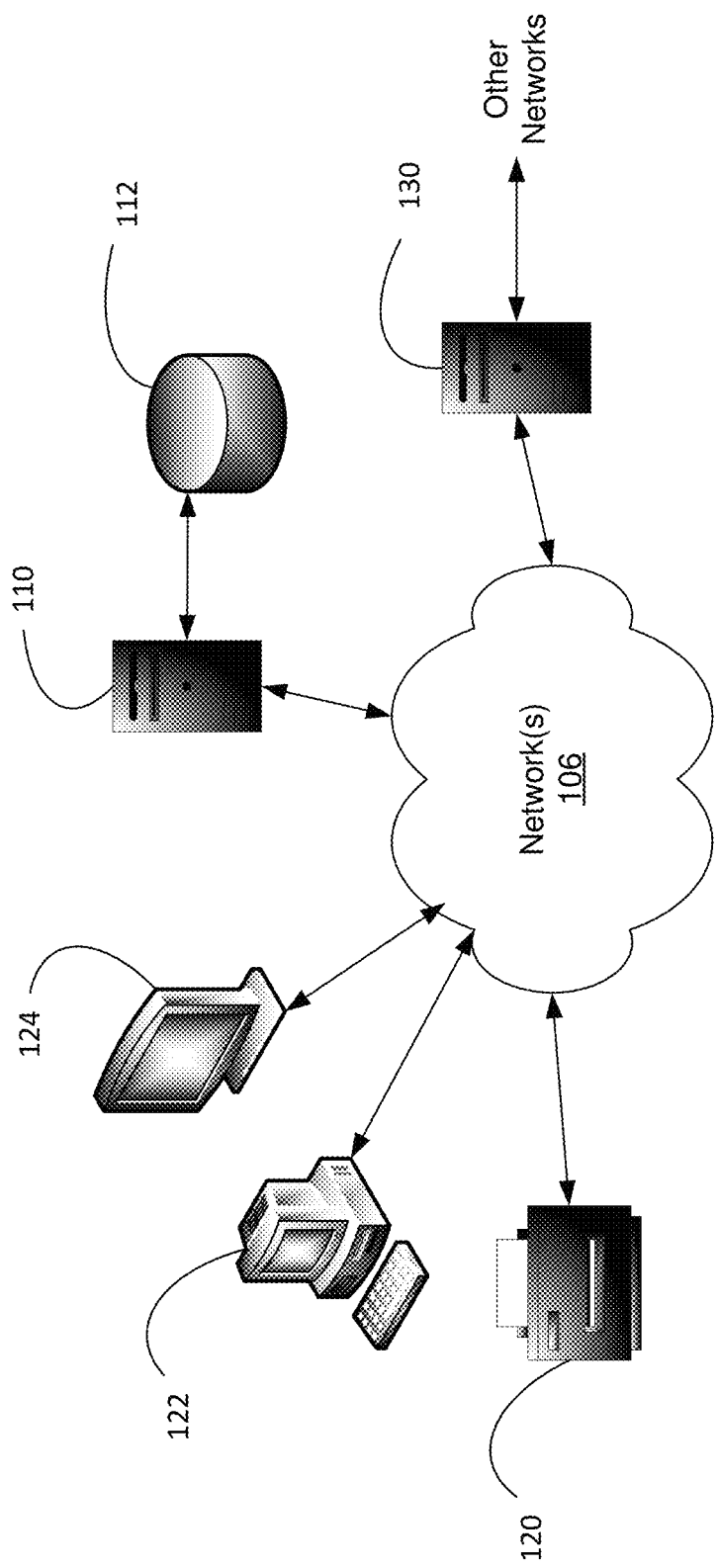
FIG. 1 is a schematic diagram depicting an example of a computer network based system that may be subject to attack and may be suitable for utilization of certain aspects of the present invention.

FIG. 1 is an architecture diagram that depicts aspects of an example of a computer network system with communication among multiple devices. In this example, network 106, which can be one network or multiple networks, provides communication between server 110 connected to database 112 and several client devices, such as printer 120, personal computer 122, and interactive terminal 124. The architecture of FIG. 1 is a simplified representation of an enterprise environment having a multitude of different computing devices that may represent a target for an attack. A gateway 130 provides a communications link between the network 106 and other networks, such as the internet, through which an attacker may launch an attack.

Heap spraying is a technique used in computer system exploits or attacks to facilitate arbitrary code execution that permits an attacker to gain control or access to a computer system. A heap spray is generally used to make a vulnerability easier to exploit. The heap spray source code attempts to put a certain sequence of bytes at a predetermined location in the memory of a target process by having it allocate large blocks on the heap of the process and fill the bytes in the allocated blocks with useful values. Heap sprays take advantage of the fact that, on most computer architectures and operating systems, the start location of large heap allocations is predictable and consecutive allocations are roughly sequential. This means that the sprayed heap will be in approximately the same location each time the heap spray is executed or at an arbitrarily chosen location with reliable alignment.

An attack on a computer system will often write specific bytes into memory, i.e. spray the heap, that will allow the attacker to gain control over the system. If the application program can be made to read an address from an arbitrary memory location, then the memory address may be used as a function pointer and redirect it to the sprayed heap. If the exploit succeeds in redirecting control flow to the sprayed heap, the bytes there will be executed, allowing the exploit to perform whatever actions the attacker wants. Therefore, in many heap sprays, the bytes on the heap are restricted to represent valid addresses within the heap spray itself, holding valid instructions for the target architecture, so the application will not crash.

For example, it is common to spray the heap with a single byte that translates to both a valid address and a no-operation (NOP) or NOP-like instruction on the target architecture. This allows the heap spray to function as a large NOP slide or sled, wherein a sequence of NOP instructions causes the CPU's execution to flow from a point of entry into the sequence towards a branch instruction that contains an address for the attack function code. The entropy of a NOP sled is dependent upon the constraints placed on it. For example, if the input providing the attack vector into which the NOP sled and payload are to be introduced are filtered, such as accepting only printable characters, the field of possible instructions for inclusion is limited.

Figure 2:
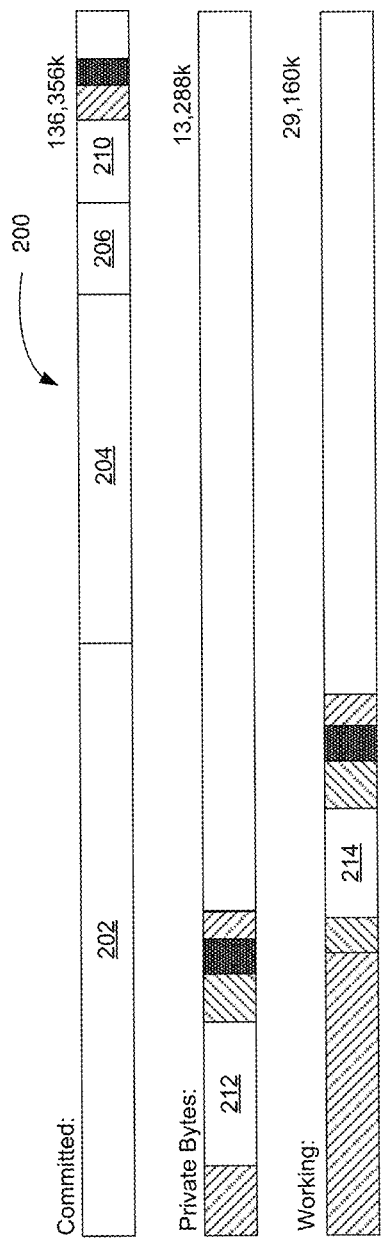
FIG. 2 is a bar graph illustrating an example of memory usage for a process before a heap spray takes place.

FIG. 2 is a bar graph illustrating an example of memory usage for a process before a heap spray takes place. The graph 200 includes portions of memory 210, 212 and 214 allocated to a backend heap for committed, private and working memory, respectively, along with memory legitimately committed to the process, such as memory blocks 202, 204 and 206. Graph 200 also includes total memory usage, e.g. 136,356 kilobytes of committed memory.

Figure 3:
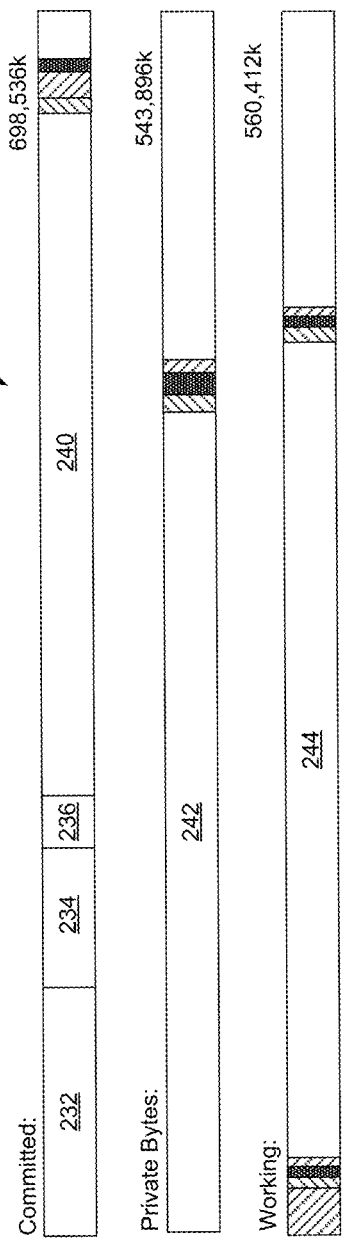
FIG. 3 is a bar graph illustrating an example of the memory usage for the process of FIG. 2 after a heap spray has taken place.

FIG. 3 is a bar graph illustrating an example of the memory usage for the process of FIG. 2 after a heap spray has taken place. The heap for a browser application, for example, may be sprayed by allocating and assigning large strings of data using Java Script. The memory portions 240, 242 and 244 allocated to the backend heap now dwarf the memory legitimately committed to the process, such as blocks 232, 234 and 236. The amount of memory used has increased significantly, e.g. committed memory growing from 136 megabytes to 698 megabytes.

Generally, embodiments of the present invention are applied to user space memory and, by extension, the virtual memory space of a single process. It is not necessary to fingerprint the total memory usage of the process on average, nor compare the actual and typical memory usage, though improbably high memory usage is somewhat indicative of heap spray. One example in accordance with the present invention includes a secondary heuristic that fingerprints the typical block size frequencies of a process on average and compares the relative prevalence of each in the instant memory snapshot with the typical case for the process. Memory is generally either committed, and thus parsed, or uncommitted and may be ignored because it has no contents. Committed memory may be allocated or not by the heap manager and allocated memory may be allocated for use by the process, e.g. user, or by the heap manager. The present invention is concerned primarily with allocated user memory, since heap spray involves the allocation of massive amounts of memory for attacker-supplied data. The detection is concerned primarily with the characteristics of that data, and the proportion of characteristic heap spray to actual memory. Some embodiments may address both unallocated memory and allocated user memory, but not allocated heap manager memory.

Figure 4:
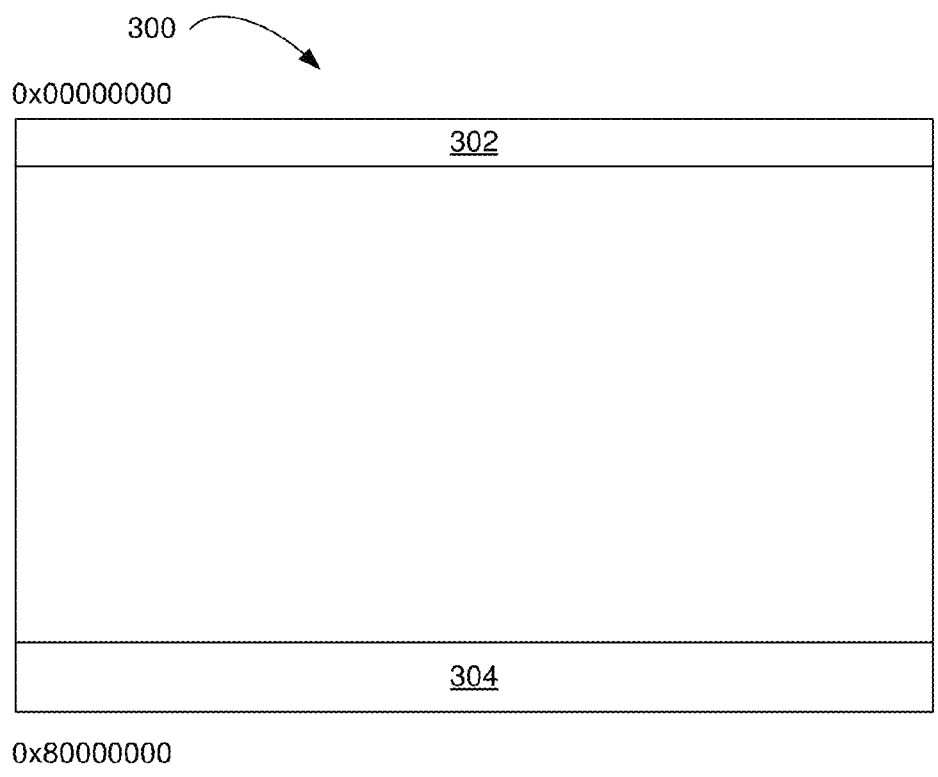
FIGS. 4 and 5 are schematic diagrams illustrating the memory layout for the example of FIGS. 2 and 3, where
Figure 5:
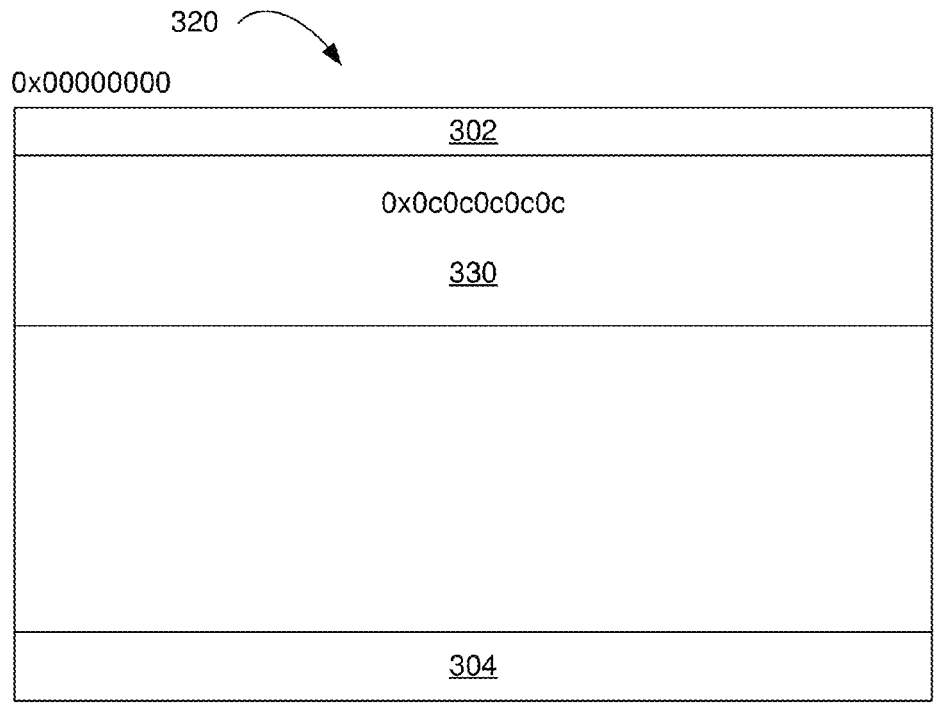

FIGS. 4 and 5 are schematic diagrams illustrating the memory layout for the example of FIGS. 2 and 3. FIG. 4 shows the memory layout before the heap spray and illustrates legitimately allocated data at positions 302 and 304. FIG. 5 shows the memory layout after the heap spray has occurred and illustrates a large block of memory 330 allocated to the heap starting at address 0x0c0c0c0c.

By introducing a large amount of data to the heap, the attacker is able to control the process memory layout so that they can reliably predict what will be in memory at an address of interest, e.g. 0x0c0c0c0c, at a particular point in execution. Once the heap is sprayed, an exploit is used to attempt to cause program execution to branch into the sprayed portion of the heap and slide through the sequence of NOP instructions until the branch instruction is encountered causing program control to branch to the malicious code at the address of the branch instruction. Another common approach is to place the first stage of the payload at the end of each block of spray and spacing it at the end of NOP slides throughout memory.

Computer processes typically generate a high level of randomness in memory due to chance alignments and timing or, in many modern systems, computer security techniques, such as Address Spray Layout Randomization (ASLR), designed to prevent certain exploits. A heap spray is used to introduce a high level of order to the memory heap to compensate for the randomness that normally occurs in computer memory and permit the attacker to more reliably succeed in gaining control. Note that the randomness described here is generally in regard to layout and not contents. Entropy also applies to the memory content, which is low in heap sprays since they generally involve addresses, of which there are a limited number of useful addresses, or NOP statements. Generally, the utility of heap spray to an attacker is proportional to the number of constraints upon it, to which its entropy is inversely proportional.

One aspect of the present invention is using an entropy-based heuristic to determine whether a set of data is the result of a heap spray or not. This may be combined with secondary heuristics to increase the accuracy of the determination. An additional evaluation that may be applied whether the amount of memory potentially involved is indicative of a heap spray, i.e. sufficiently large to support an attack with a reasonable probability of success.

Figure 6:
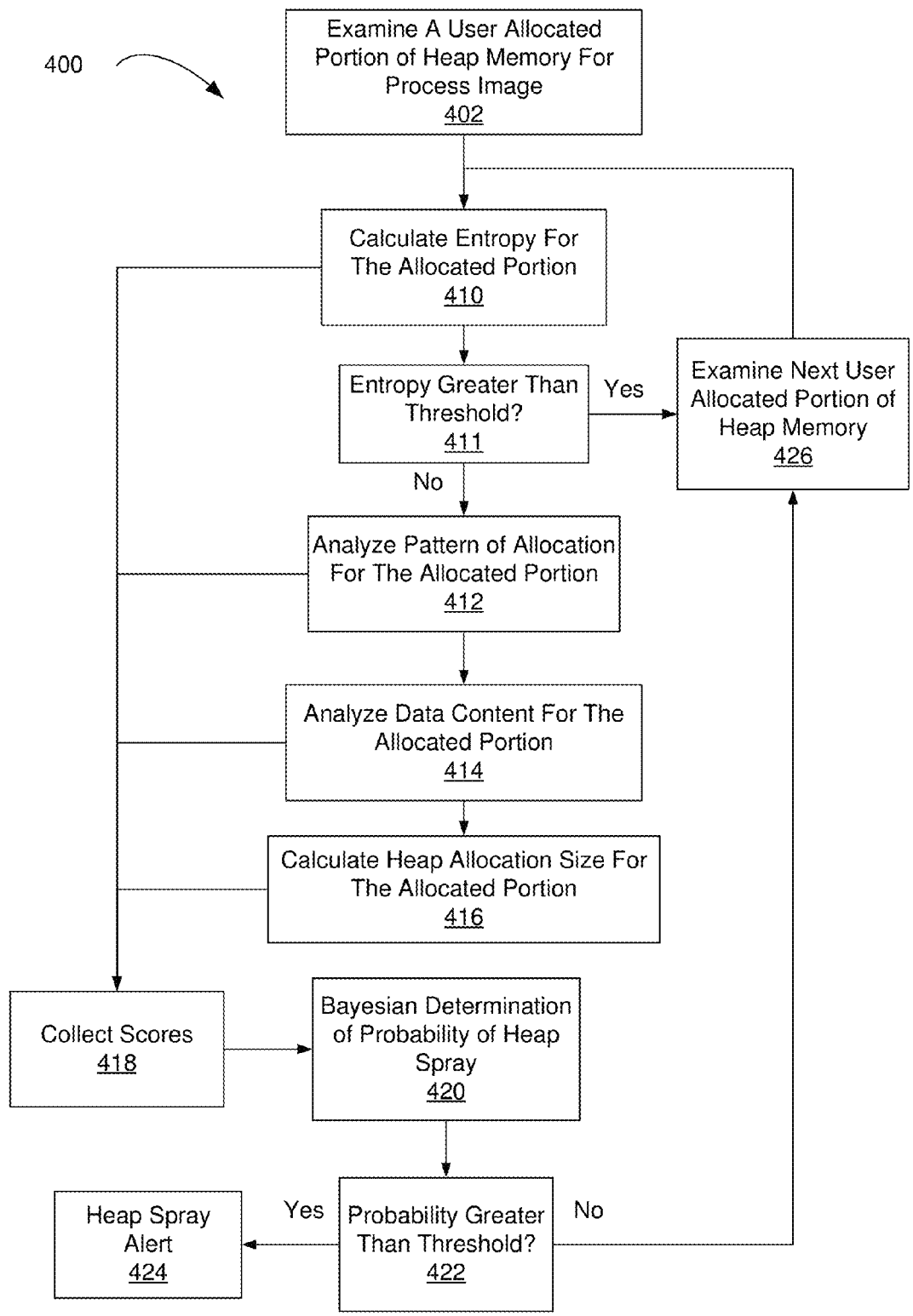
FIG. 6 is a control flow diagram illustrating one example of a process for detecting a heap spray in accordance with certain aspects of the present invention.

One example of a process 400 for detecting a heap spray in accordance with certain aspects of the present invention is shown in the control flow diagram of FIG. 6. In this example, at step 410, the allocated portion of heap memory is analyzed for low-entropy segments of memory that are indicative of a heap spray. In one example, Shannon entropy principles are applied to determine, for each allocated block, the information content of the data, and specifically whether it is lower than some arbitrary threshold, as one input to a multivariate heuristic. In another example, Shannon entropy principles are applied to fingerprint the expected information content of data in the process image in general based upon previous data contained in the heap regions of other images of the same program, to establish a basis for comparison. In still another example, the Shannon entropy of each chunk of memory is compared against the expected entropy, to classify certain chunks as low-entropy or high-entropy.

Note that entropy is generally based on the length of the portion of heap memory so that an entropy rate is compared to a threshold rather than a total entropy amount within the allocated portion of memory. In one example, an expected entropy rate for the heap data is compared to a low-entropy threshold. In another example, a total cumulative size of regions of the heap that into a low-entropy category based on their size or manner of allocation is compared to a threshold value. Aspects of several of these examples may be combined in various implementations.

For example, the sequence of NOP instructions in a NOP slide exhibits low entropy. In one embodiment, a Shannon entropy calculation is used that has a 256-symbol alphabet (e.g. a byte stream) and is performed on data from the beginning of the user-allocated portion of a chunk of heap memory to its end and an entropy score is generated. The entropy score is output to step 418, for collection and aggregation and the score is checked, at step 411, to determine whether the entropy level is low enough to indicate a possible heap spray. If the entropy is high, which is consistent with memory patterns for a normal process, then control branches to step 426 to get the next user allocated portion of heap memory for analysis. If the entropy is low enough to be consistent with a heap spray, then control branches to step 412 so that other heuristics are utilized to raise the degree of certainty that the memory pattern relates to a heap spray.

In process 400, if the entropy is low enough to meet the selected threshold at step 411, then control branches to analysis using secondary heuristics. Attackers have a larger library of techniques at their disposal than simply generating long repeating sequences. Accordingly, it is valuable to inspect other characteristics of data such as the pattern of allocations in the program and the contents of data for their utility to an attacker.

In this example, control flow branches to step 412, where the pattern of memory allocation for the portion under examination is analyzed, such as the size and spacing of allocations, to provide additional certainty with relation to the determination of whether a given single allocation contains data which is likely to be the result of heap spray techniques being employed by an attacker. For example, attempts to influence the operating system's memory allocator to commit new ranges of memory in order to increase address diversity (and thus heap spray coverage) in the higher bits of the address are analyzed for repetitive virtual memory allocations, which are typically larger chunks of memory taken from regions of memory that are not part of the managed heap. A score is developed at step 412 that is output for collection at step 418 and control flow continues to step 414.

At step 414, the allocated portion of heap memory is analyzed for data content to provide additional certainty or to provide negative certainty. In one example, the allocated portion is inspected for segments of data which look like ASCII text, which may be of use to an attacker because they tend to bypass input filters and not confuse parsers that use certain sequences for control. In another example, the allocated portion is inspected for text patterns that are not repeating sequences, but are identifiable, such as text patterns from previous attacks, such as a preponderance toward certain characters or character sets. In still another example, the allocated portion is inspected for a pattern that is low entropy and executable, such as a NOP slide, which is common in heap sprays, that includes long sequences of repeating NOP instructions, i.e. low entropy that are also executable. A score is developed and output for collection at step 418 and control flow continues to step 416.

At step 416, the allocated portion is analyzed for the heap allocation size. Attempts to influence the operating system's memory allocator to commit new ranges of memory in order to increase address diversity (and thus heap spray coverage) in the higher bits of the address are inspected for, in one example, by checking for repetitive virtual memory allocations, e.g. larger chunks of memory taken from regions of memory not part of the managed heap. Another common characteristic of a heap spray is that it attempts to dominate the address space of the process image in which it resides. This characteristic is illustrated in FIGS. 3 and 5, wherein the data introduced through the heap spray dwarfs the legitimate process data. Note the difference in the amount of working memory legitimately utilized in FIG. 2, e.g. 29,160 Kilobytes, to the amount utilized as a result of a heap spray shown in FIG. 3, e.g. 560,412 Kilobytes. Also note the differences in memory allocation illustrated in FIGS. 4 and 5. In one example, the proportion of data contained within each allocation, weighted according to certainty that it is the type of data expected from heap spray, is compared with the total amount of memory in all of allocations for a process, to provide a value usable as an independent variable for consideration in a test for heap spray in the process dump in general.

While heap memory manipulation attacks ("heap feng shui") exist that do not create disproportionately large memory allocations, such behavior is a common characteristic of heap spray attacks. The attack classes are different because more fine-grained manipulation of memory layout requires a more detailed understanding of the behavior and state of the memory allocator. This information is not always available and not all attackers are able to utilize it. In one example, the size of allocated portion being analyzed and which may be involved in a heap spray is compared to the totality of memory allocated to the associated process to determine whether the suspected portion actually comprises a large proportion of memory. In another example, the size of the process image may be checked to determine whether it is uncharacteristically large for the type of process. A score is developed and output for collection at step 418 and control flow also flows to step 418.

At step 418, the results from the heuristics of steps 410, 412, 414 and 416 are collected and aggregated. In one embodiment, step 418 collects the heuristic data for the analysis of one allocated portion of memory. In another embodiment, step 418 includes collecting and aggregating the analysis results for all of the heap allocations for a process image. For example, the heuristics are performed on each heap allocation in turn, and the aggregated results of are combined with a count of heap allocation size for the entire process image under examination to determine the similarity of the data to an ideal heap spray, which is transformed into a Bayesian probability of heap spray.

The aggregated score is then input to step 420 for a Bayesian determination of the probability that the allocated heap portion under examination has been heap sprayed. In one example, a probability density curve is applied to normalize the aggregated data and to provide a percentage Bayesian probability that the dump contains intentional heap spray. If the probability is greater than a preselected level, then control flows to step 424 to raise an alert that a heap spray event may have occurred.

Figure 7:
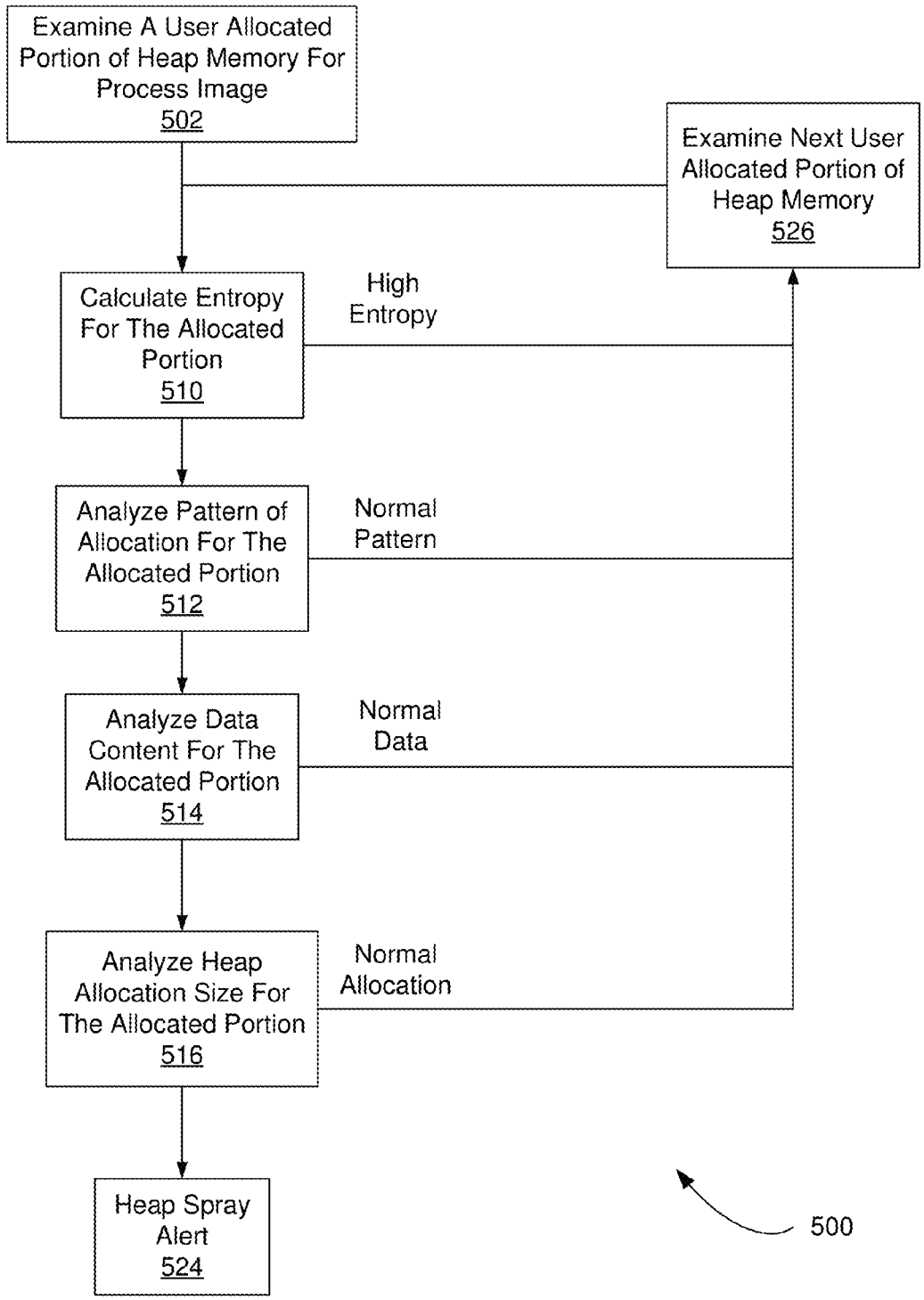
FIG. 7 is a control flow diagram illustrating another example of a process for detecting a heap spray in accordance with certain aspects of the present invention.

FIG. 7 is another example of a process 500 for detecting a heap spray in accordance with certain aspects of the present invention. Process 500 begins with an entropy analysis at step 510 and, if the entropy is above a predetermined threshold, then the allocated portion is unlikely to have been the target of a heap spray and control branches to step 526 to assess the next portion. If the entropy is low, then control flows through a series of other heuristics to assess whether the allocated portion has been heap sprayed. In this example, the heuristics are applied serially and if one of the heuristics shows a contraindication that the portion of heap memory under assessment is not consistent with a heap spray, then analysis moves to the next portion of heap memory. At step 512, the pattern of allocation is analyzed and, if the pattern appears normal, control branches to step 526. If the pattern is not consistent with a normal process image, then control branches to step 514 to analyze the data content. If the data content appears normal, then control branches to step 526. If the data content is not consistent with a normal process image, then control branches to step 516 for analysis of the size of the allocated portion. If the allocation appears to be normal, then control branches to step 526 and, if it's not normal, control branches to step 524 to raise an alert of a possible heap spray. Note that the heuristics of steps 512, 514, and 516 may be placed in different order. In addition, the heuristics are examples and additional or different heuristics, or fewer heuristics, may be applied to the analysis.

Note that the entropy threshold and content characteristic heuristics are not arbitrary. The entropy threshold is generally based on the expected entropy of the data, which, in some examples, is a real factor, such as the average entropy of English text or the entropy of process data under non-attack conditions as observed on average, combined with a margin of error, e.g. two standard deviations. In certain embodiments, the content characteristic heuristics are generally based on specific constraints, such as printability (positive), matching a known benign fill pattern (negative), executability (positive), etc.

Other variations of the examples shown in FIGS. 6 and 7 exist that fall within the scope of the invention. Generally, the determination of heap spray is holistic with respect to a memory image. As a result, it may be useful to classify each chunk of user allocated (or in one refinement, user allocated or unallocated but committed and managed) memory, count the total amount of such memory, and then make the classification decision. For example, in FIG. 7, a modification to step 524 would involve adding the number of bytes to the quantity of possible heap spray and continue processing until no more portions of the memory image remain that need analysis. For example, some or all of the steps 510, 512, 514 and 516 could be performed on each portion of heap memory examined and the results of these steps accumulated at step 524. A probability distribution function would then be applied to the cumulative analytical data for the memory image in order to make the determination of whether a heap spray event has occurred or not and, if the determination is positive, an alert will then be issued. Also, the fact that the results of steps 512, 514, and 516 are normal, i.e. are not indicative of heap spray, may not be dispositive as to whether a heap spray is present. One example in accordance with certain aspects of the present invention forces the weight value of the score for the memory portion under analysis to 0 unless either step 510 or two other steps are not benign, e.g. indicative of heap spray, and forces the weight to 1 (out of 1) if all of steps 512, 514, and 516 do not indicate a benign indication or if 510 does not and one of steps 512, 514, and 516 do not. However, in some examples, the result of step 514 may establish that the memory portion is not heap sprayed, e.g. the indication shows that the memory data reflects a common allocation fill pattern, and forces the weight to 0. For example, each of the individual heuristic steps may have multiple features, such as a weight and a rule defining whether the heuristic indicates or contraindicates heap spray, which might be combined with the output of other heuristic steps to establish a particular weighting for the result. Some examples might be modelled similarly to a non-learning neural network, i.e. static or without feedback, with one hidden layer. Similarly, an alternative to the example of FIG. 6 may involve analytical steps that are not dispositive rules, but are accumulated weighted scores and the Bayesian determination is made using a probability distribution function particularly appropriate to detecting heap spray the custom PDF that is applied to the results for all the user allocated memory portions, or unallocated but managed memory portions, for the memory image.

The processes 400 and 500 of FIGS. 6 and 7 may be applied to process images contained in core dumps or similar process image dumps due to a crash or failure event. Analysis of a core dump from a failure event is generally more effective than analysis of arbitrary data or input data, since, in the former case, the data has already been consumed by the process. Therefore, the effect of the data can be analyzed directly rather than merely inferred from the data itself. It is beneficial to observe the effect of the data on the process because examples of the present invention are generally more concerned with manipulating process state than crafting data.

One embodiment in accordance with certain aspects of the present invention is a mechanism for extracting the user-allocated data from the heap memory of a crashed process, by parsing the file format of a core dump, e.g. A Linux GDB core dump or a Windows mini-dump, with metadata indicating the manner in which it was allocated, expressed as a series of allocated blocks (whether still allocated or since freed as of the time the process dump was taken) and their contents. In some embodiments, the present invention may provide not only for a mechanism to inspect the data, but to leverage the program's semantic parsing of that data to show the effect the data has on memory allocation structure (particularly in the heap) and contents. This may be particularly useful where the data's generating grammar is not known, or where there is not an exact correspondence between the data being loaded and the program's representation of that data in memory.

Embodiments of the invention are sensitive to the goals of an attacker in that they looks not only for low-entropy segments of memory, but also inspect the memory structure and contents to create additional certainty to the positive detection of a heap spray. In one example, the secondary heuristics can be an arbitrary subset or weighted accumulation of secondary heuristics, or a combination of the secondary heuristics with the primary one. In this example, the primary heuristic is the entropy analysis and structural analysis is secondary, as are non-entropy content metrics. This embodiment uses a weighting that involves analyzing the amount of data weighted by the heuristics it matches, and then applies a probability density function to that number as compared with the total amount of unweighted data. In this example, the Bayesian probability that a heap spray event is present is a function of the cumulative probability density function established for the aggregate heuristic output.

In accordance with at least one embodiment of the invention, the system, apparatus, methods, processes and/or operations described herein may be wholly or partially implemented in the form of a set of instructions executed by one or more programmed computer processors, such as a central processing unit (CPU) or microprocessor. Such processors may be incorporated in an apparatus, server, client or other computing device operated by, or in communication with, other components of the system. In accordance with another embodiment of the invention, the system, apparatus, methods, processes and/or operations described herein may be wholly or partially implemented in the form of a set of processor executable instructions stored on persistent storage media.

Figure 8:
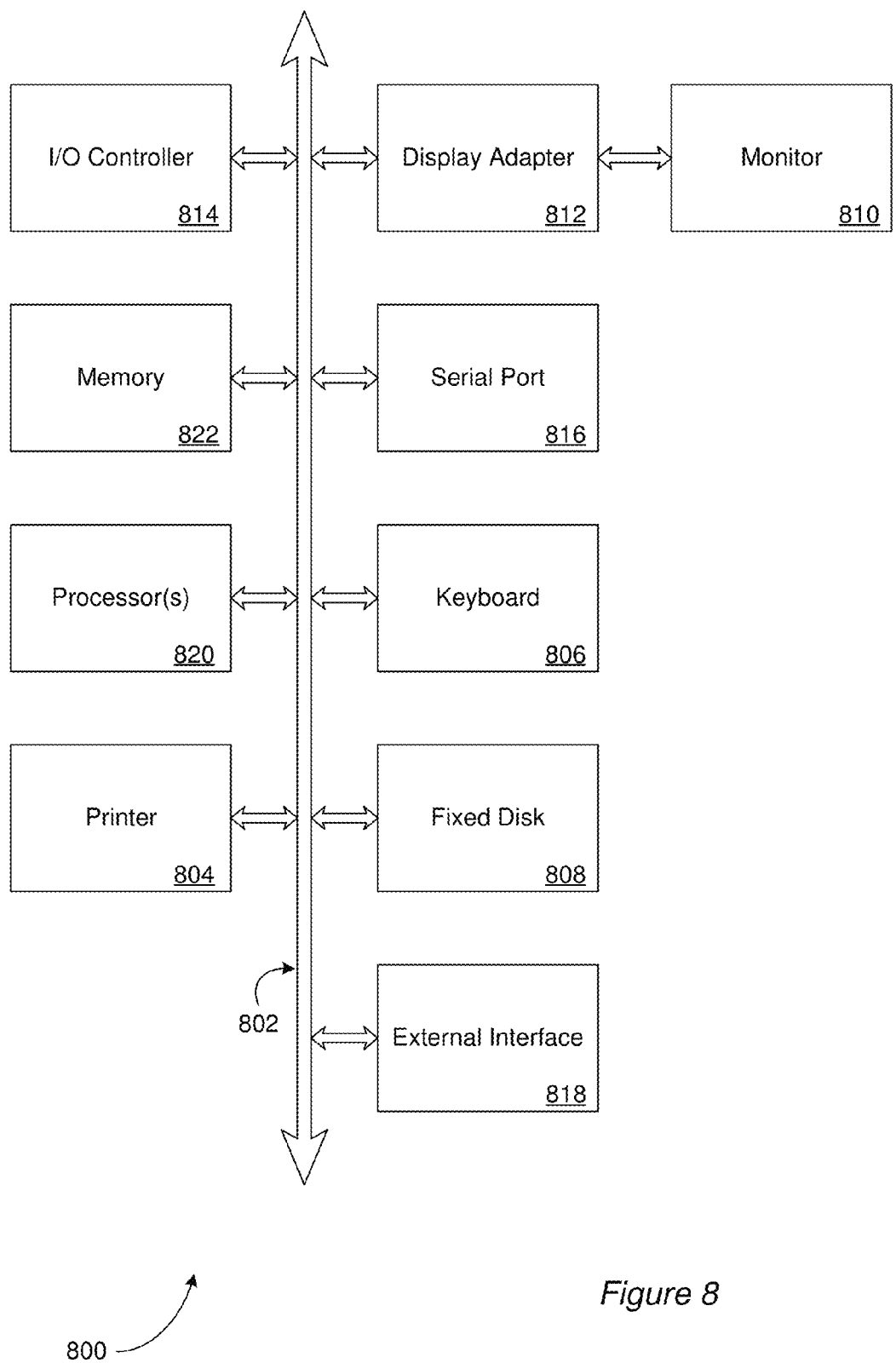
FIG. 8 depicts aspects of elements that may be present in a computer device and/or system configured to implement a method, system and/or process in accordance with some embodiments of the present invention.

FIG. 8 depicts aspects of elements that may be present in one example of a computer device and/or system 800 configured to implement at least some elements of a method, system and/or process in accordance with some embodiments of the present invention. The subsystems shown in FIG. 8 are interconnected via a system bus 802. Additional subsystems include a printer 804, a keyboard 806, a fixed disk 808, and a monitor 810, which is coupled to a display adapter 812. Peripherals and input/output (I/O) devices, which couple to an I/O controller 814, can be connected to the computer system by any number of means known in the art, such as a serial port 816. For example, the serial port 816 or an external interface 818 can be utilized to connect the computer device 800 to further devices and/or systems not shown in FIG. 8 including a wide area network such as the Internet, a mouse input device, and/or a scanner. The interconnection via the system bus 802 allows one or more processors 820 to communicate with each subsystem and to control the execution of instructions that may be stored in a system memory 822 and/or the fixed disk 808, as well as the exchange of information between subsystems. The system memory 822 and/or the fixed disk 808 may embody a tangible computer-readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes or functions described in this application may be implemented as software code to be executed by a processor using any suitable computer language such as, for example, Java, C++ or Perl or using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM, where the code is persistently stored sufficient for a processing device to access and execute the code at least once. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Different arrangements of the components or steps depicted in the drawings or described above, as well as components and steps not shown or described, are possible without departing from the scope of the invention. Similarly, some features and subcombinations are useful and may be employed without reference to other features and subcombinations. Embodiments of the invention have been described for illustrative and not restrictive purposes, and alternative embodiments will be apparent to one of ordinary skill in the art. Accordingly, the present invention is not limited to the embodiments described above or depicted in the drawings, and various embodiments and modifications can be made without departing from the scope of the invention.

I claim:

1. A method for detecting a heap spray event, the method comprising the steps of:
   examining one or more user allocated portions of heap memory for a process image;
   determining a level of entropy for the one or more user allocated portions;
   if the level of entropy is below a predetermined threshold, then performing one or more secondary heuristics, wherein the step of performing one or more secondary heuristics includes one or more of the following steps:
      analyzing a pattern of memory allocation for the one or more user allocated portions of heap memory,
      analyzing data content of the one or more user allocated portions of heap memory, and
      analyzing a heap allocation size for the one or more user allocated portions of heap memory;
   detecting a heap spray event based on results of the one or more secondary heuristics, wherein the step of detecting a heap spray event based on results of the one or more secondary heuristics further includes:
      collecting scores from one or more secondary heuristics performed for the one or more user allocated portions of heap memory for the process image,
      applying a Bayesian probability to the collected scores, and
      determining whether the Bayesian probability is greater than a predetermined threshold;
   collecting and aggregating analysis results for multiple heap allocations for the process image;
   combining the aggregated analysis results with a count of heap allocation size for the process image under examination;
   comparing the analysis results for the process image under examination to the aggregated analysis results to determine a Bayesian probability of a heap spray event for the process image under examination;
   applying a probability density curve to normalize the aggregated analysis results; and
   the step of comparing the analysis results for the process image under examination to the aggregated analysis results to determine a Bayesian probability of a heap spray event for the process image under examination includes providing a percentage Bayesian probability that the process image under examination contains a heap spray event.

2. The method for detecting a heap spray event of claim 1, wherein the step of detecting a heap spray event based on results of the one or more secondary heuristics further includes detecting a heap spray event if the result of each of the one or more secondary heuristics is consistent with a heap spray event.

3. The method for detecting a heap spray event of claim 1, wherein the step of analyzing a pattern of memory allocation for the one or more user allocated portions of heap memory includes at least one of the following steps:
   comparing the pattern of memory allocation to text patterns from previous attacks;
   inspecting the allocated portions for low entropy and executability;
   comparing a size of the allocated portion for repetitive virtual memory allocations; and
   comparing a size of the allocated portion to a normalized size from previous analysis runs.

4. A heap spray detection system, the system comprising one or more processing devices each having at least one non-transitory computer readable medium having stored therein processor executable instructions that, when executed, cause the one or more processing devices to perform the following functions:
   examine one or more user allocated portions of heap memory for a process image;
   determine a level of entropy for the one or more user allocated portions;
   detect whether the level of entropy is below a predetermined threshold and, responsive thereto, perform one or more secondary heuristics, wherein the function to perform one or more secondary heuristics includes one or more of the following functions:
      analyze a pattern of memory allocation for the one or more user allocated portions of heap memory,
      analyze data content of the one or more user allocated portions of heap memory, and
      analyze a heap allocation size for the one or more user allocated portions of heap memory;
   detect a heap spray event based on results of the one or more secondary heuristics, wherein the function to detect a heap spray event based on results of the one or more secondary heuristics further includes:
      collect scores from one or more secondary heuristics performed for the one or more user allocated portions of heap memory for the process image,
      apply a Bayesian probability to the collected scores, and
      determine whether the Bayesian probability is greater than a predetermined threshold;
   collect and aggregate analysis results for multiple heap allocations for the process image;
   combine the aggregated analysis results with a count of heap allocation size for the process image under examination;
   compare the analysis results for the process image under examination to the aggregated analysis results to determine a Bayesian probability of a heap spray event for the process image under examination;
   apply a probability density curve to normalize the aggregated analysis results; and
   compare the analysis results for the process image under examination to the aggregated analysis results to determine a Bayesian probability of a heap spray event for the process image under examination by providing a percentage Bayesian probability that the process image under examination contains a heap spray event.

5. The heap spray detection system of claim 4, wherein the system is further configured such that the function to detect a heap spray event based on results of the one or more secondary heuristics further includes to detect a heap spray event if the result of each of the one or more secondary heuristics is consistent with a heap spray event.

6. A non-transitory computer readable medium storing computer code having instructions stored therein that configure a processing device to operate to detect a heap spray attack event as follows:
   examining one or more user allocated portions of heap memory for a process image;
   determining a level of entropy for the one or more user allocated portions;
   if the level of entropy is below a predetermined threshold, then performing one or more secondary heuristics;
   detecting a heap spray event based on results of the one or more secondary heuristics, by detecting a heap spray event if the result of each of the one or more secondary heuristics is consistent with a heap spray event;

collecting and aggregating analysis results for multiple heap allocations for the process image;

combining the aggregated analysis results with a count of heap allocation size for the process image under examination;

comparing the analysis results for the process image under examination to the aggregated analysis results to determine a Bayesian probability of a heap spray event for the process image under examination;

applying a probability density curve to normalize the aggregated analysis results; and the comparing the analysis results for the process image under examination to the aggregated analysis results to determine a Bayesian probability of a heap spray event for the process image under examination includes providing a percentage Bayesian probability that the process image under examination contains a heap spray event.

7. The persistent computer readable medium of claim 6, wherein the instructions for configuring a processing device include instructions for at least one of the following functions:

comparing the pattern of memory allocation to text patterns from previous attacks;

inspecting the allocated portions for low entropy and executability;

comparing a size of the allocated portion for repetitive virtual memory allocations; and comparing a size of the allocated portion to a normalized size from previous analysis runs.

* * * * *